(12) United States Patent
Robbins et al.

(10) Patent No.: US 9,274,338 B2
(45) Date of Patent: Mar. 1, 2016

(54) INCREASING FIELD OF VIEW OF REFLECTIVE WAVEGUIDE

(75) Inventors: Steve Robbins, Bellevue, WA (US); David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 412 days.

(21) Appl. No.: 13/426,379

(22) Filed: Mar. 21, 2012

(65) Prior Publication Data
US 2013/0250430 A1    Sep. 26, 2013

(51) Int. Cl.
*G02B 27/14*    (2006.01)
*G02B 5/00*    (2006.01)
*G02B 27/01*    (2006.01)

(52) U.S. Cl.
CPC .......... *G02B 27/0172* (2013.01); *G02B 27/017* (2013.01); *G02B 2027/015* (2013.01); *G02B 2027/0125* (2013.01); *G02B 2027/0178* (2013.01)

(58) Field of Classification Search
CPC ...... G02B 27/017; G02B 6/00; G02B 6/0013; G02B 27/0172; G02B 2027/0178; G02B 2027/0174; G02B 27/0101; G02B 2027/0118; G02B 27/10; G06F 3/013; D04H 5/12
USPC .................... 359/630–632; 345/7–9
See application file for complete search history.

(56) References Cited

U.S. PATENT DOCUMENTS

| | | | |
|---|---|---|---|
| 4,576,436 A | 3/1986 | Daniel | |
| 4,711,512 A | 12/1987 | Upatnieks | |
| 5,368,038 A | 11/1994 | Fraden | |
| 5,856,842 A | 1/1999 | Tedesco | |
| 5,953,477 A | 9/1999 | Wach et al. | |
| 6,323,970 B1 | 11/2001 | Popovich | |
| 6,392,801 B1 * | 5/2002 | Southwell | 359/485.03 |
| 6,580,529 B1 | 6/2003 | Amitai et al. | |
| 6,829,095 B2 | 12/2004 | Amitai | |
| 6,999,665 B2 | 2/2006 | Veligdan | |
| 7,184,615 B2 | 2/2007 | Levola | |
| 7,576,916 B2 | 8/2009 | Amitai | |
| 8,160,411 B2 | 4/2012 | Levola et al. | |
| 8,233,204 B1 | 7/2012 | Robbins et al. | |
| 8,611,014 B2 | 12/2013 | Valera et al. | |
| 8,817,350 B1 | 8/2014 | Robbins et al. | |
| 2007/0041684 A1 | 2/2007 | Popovich et al. | |

(Continued)

OTHER PUBLICATIONS

Mukundan, et al., "Waveguide-Based Biosensors for Pathogen Detection", Retrieved at <<www.mdpi.com/1424-8220/9/7/5783/pdf>>, Sensors 2009, vol. 9, Retrieved Date: Dec. 12, 2011, pp. 5783-5809.

(Continued)

*Primary Examiner* — Alicia M Harrington
(74) *Attorney, Agent, or Firm* — Micah Goldsmith; Judy Yee; Micky Minhas (57) ABSTRACT

A near-eye display system includes an image former and a waveguide. The image former is configured to form a display image and to release the display image through a first exit pupil. The waveguide presents a back surface that faces the wearer's eye, and a front surface opposite the back surface. The waveguide is substantially transparent to external imagery received normal to the front surface, and is configured to receive the display image from the image former and to release the display image through a second exit pupil, which is larger than the first exit pupil.

18 Claims, 9 Drawing Sheets

(56) References Cited

U.S. PATENT DOCUMENTS

| | | | |
|---|---|---|---|
| 2009/0052046 A1* | 2/2009 | Amitai | 359/629 |
| 2011/0211787 A1 | 9/2011 | Kuo et al. | |
| 2011/0227487 A1* | 9/2011 | Nichol | G02B 6/0018 315/158 |
| 2011/0242670 A1 | 10/2011 | Simmonds | |
| 2014/0204455 A1 | 7/2014 | Popovich et al. | |

OTHER PUBLICATIONS

Cameron, Alex., "The Application of Holographic Optical Waveguide Technology to Q-Sight™ Family of Helmet Mounted Displays", Retrieved at <<http://144.206.159.178/ft/CONF/16431969/16431986.pdf>>, Proceedings of the SPIE, vol. 7326, 2009, pp. 11.

Mukawa, et al., "A full-color eyewear display using planar waveguides with reflection volume holograms", Journal of the SID, 2009, pp. 185-193.

Minier, V. et al., "Diffraction Characteristics of Superimposed Holographic Gratings in Planar Optical Waveguides," IEEE Photonics Technology Letters, vol. 4, No. 10, Oct. 1992, 4 pages.

Pu, A. et al., "Exposure Schedule for Multiplexing Holograms in Photopolymer Films," Optical Engineering, vol. 35, No. 10, Oct. 1996, 6 pages.

Han, X. et al., "Accurate Diffraction Efficiency Control for Multiplexed Volume Holographic Gratings," Optical Engineering, vol. 41, No. 11, Available Online Oct. 2002, 13 pages.

Yan, A. et al., "Multiplexing Holograms in the Photopolymer with Equal Diffraction Efficiency," Advances in Optical Data Storage Technology, SPIE vol. 5643, Nov. 2004, 9 pages.

Massenot, S. et al., "Multiplexed Holographic Transmission Gratings Recorded in Holographic Polymer-Dispersed Liquid Crystals: Static and Dynamic Studies," Applied Optics, vol. 44, No. 25, Sep. 2005, 8 pages.

Zharkova, G. et al., "Study of the Dynamics of Transmission Gratings Growth on Holographic Polymer-Dispersed Liquid Crystals," International Conference on Methods of Aerophysical Research, ICMAR 2008, Jun. 2008, 4 pages.

\* cited by examiner

INCREASING FIELD OF VIEW OF REFLECTIVE WAVEGUIDE

BACKGROUND

Near-eye display technology may be used to present video or computer-display imagery with utmost privacy and mobility. Such technology may be incorporated into a head-mounted display (HMD) device in the form of eyeglasses, goggles, a helmet, a visor, or other eyewear. In a typical near-eye display approach, a small-format display image is received into suitable optics and re-directed toward a wearer's eye. One challenge in this area is to present the display image over a sufficiently expansive field of view, but without resorting to large, unwieldy optics that the wearer may find objectionable.

SUMMARY

This disclosure describes a near-eye display system that includes an image former and a waveguide. The image former is configured to form a display image and to release the display image through a first exit pupil. The waveguide presents a back surface that faces the wearer's eye, and a front surface opposite the back surface. The waveguide is substantially transparent to external imagery received normal to the front surface, and is configured to receive the display image from the image former and to release the display image through a second exit pupil, larger than the first exit pupil.

In one embodiment, the front and back surfaces of the waveguide each support a partially reflective dielectric cladding. In another embodiment, the waveguide includes a plurality of transparent sections arranged end-to-end, each transparent section supporting a beamsplitter. The beamsplitter of one transparent section is joined to an adjacent transparent section via a bonding region of thickness much less than the shortest wavelength of light from the display image. Additional embodiments include waveguides having both a partially reflective dielectric cladding and the transparent section structure noted above.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
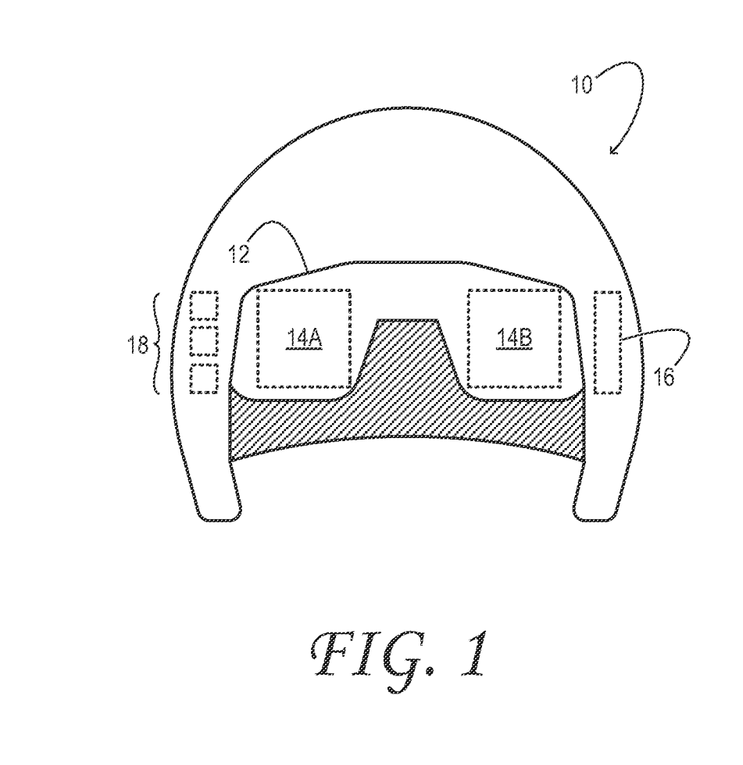
FIGS. 1 and 2 show example HMD devices in accordance with embodiments of this disclosure.

FIG. 1 shows an example HMD device 10 in one embodiment. HMD device 10 is a helmet having a visor 12. Between the visor and each of the wearer's eyes is arranged a near-eye display system 14: system 14A is arranged in front of the right eye; system 14B is arranged in front of the left eye. The HMD device also includes controller 16 and sensors 18. The controller is a microcomputer operatively coupled to both near-eye display systems and to the sensors.

Sensors 18 may be arranged in any suitable location in HMD device 10. They may include a gyroscope or other inertial sensor, a global-positioning system (GPS) receiver, and/or a barometric pressure sensor configured for altimetry. These sensors may provide data on the wearer's location or orientation. From the integrated responses of the sensors, controller 16 may track the movement of the HMD device within the wearer's environment.

In one embodiment, sensors 18 may include an eye-tracker—i.e., a sensor configured to detect an ocular state of the wearer of HMD device 10. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used by controller 16 for placement of a computer-generated display image, for example.

In the illustrated embodiment, each near-eye display system 14 is at least partly transparent, to provide a substantially unobstructed field of view in which the wearer can directly observe his physical surroundings. Each near-eye display system is configured to present, in the same field of view, a computer-generated display image. Controller 16 may control the internal componentry of near-eye display systems 14A and 14B in order to form the desired display images. In one embodiment, controller 16 may cause near-eye display systems 14A and 14B to display the same image concurrently, so that the wearer's right and left eyes receive the same image at the same time. In another embodiment, the near-eye display systems may project somewhat different images concurrently, so that the wearer perceives a stereoscopic, i.e., three-dimensional image. In one scenario, the computer-generated display image and various real images of objects sighted through a near-eye display system may occupy different focal planes. Accordingly, the wearer observing a real-world object may have to shift his or her corneal focus in order to resolve the display image. In other scenarios, the display image and at least one real image may share a common focal plane.

In the HMD devices disclosed herein, near-eye display system 14 may also be configured to acquire video of the surroundings sighted by the wearer. The video may include depth video. It may be used to establish the wearer's location, what the wearer sees, etc. The video acquired by the near-eye display system may be received in controller 16, and the controller may be configured to process the video received. To this end, near-eye display system 14 may include a camera. The optical axis of the camera may be aligned parallel to a line of sight of the wearer of the HMD device, such that the camera acquires video of the external imagery sighted by the wearer. As the HMD device may include two near-eye display systems—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

Figure 2:
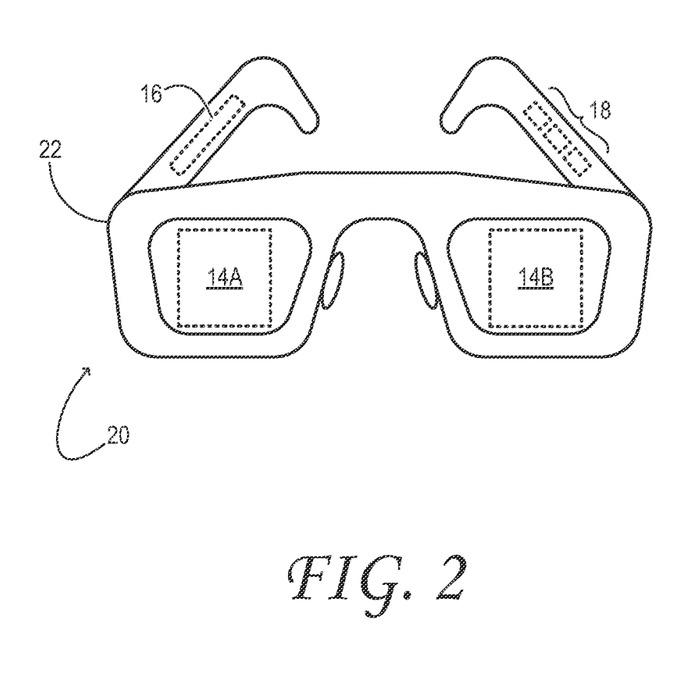

FIG. 2 shows another example HMD device 20. HMD device 20 may closely resemble an ordinary pair of eyeglasses or sunglasses, but it too includes near-eye display systems 14A and 14B, sensors 18, and controller 16. HMD device 20 also includes wearable mount 22, which positions the near-eye display systems a short distance in front of the wearer's eyes. In the embodiment of FIG. 2, the wearable mount takes the form of conventional eyeglass frames.

No aspect of FIG. 1 or 2 is intended to be limiting in any sense, for numerous variants are contemplated as well. In some embodiments, for example, a vision system separate from near-eye display systems 14 may be used to acquire video of what the wearer sees. In some embodiments, a binocular near-eye display system extending over both eyes may be used instead of the monocular near-eye display system shown in the drawings. Likewise, an HMD device may include a binocular eye tracker. In some embodiments, an eye tracker and near-eye display system may be integrated together, and may share one or more optics.

The HMD devices disclosed herein may be used to support a virtual-reality (VR) or augmented-reality (AR) environment for one or more participants. A realistic AR experience may be achieved with each AR participant viewing his environment naturally, through passive optics of the HMD device. Computer-generated imagery, meanwhile, may be projected into the same field of view in which the real-world imagery is received. Imagery from both sources may appear to share the same physical space.

The controller in the HMD device may be configured to run one or more computer programs that support the VR or AR environment. In some embodiments, some computer programs may run on an HMD device, and others may run on an external computer accessible to the HMD device via one or more wired or wireless communication links. Accordingly, the HMD device may include suitable wireless componentry, such as Wi-Fi.

Figure 3:
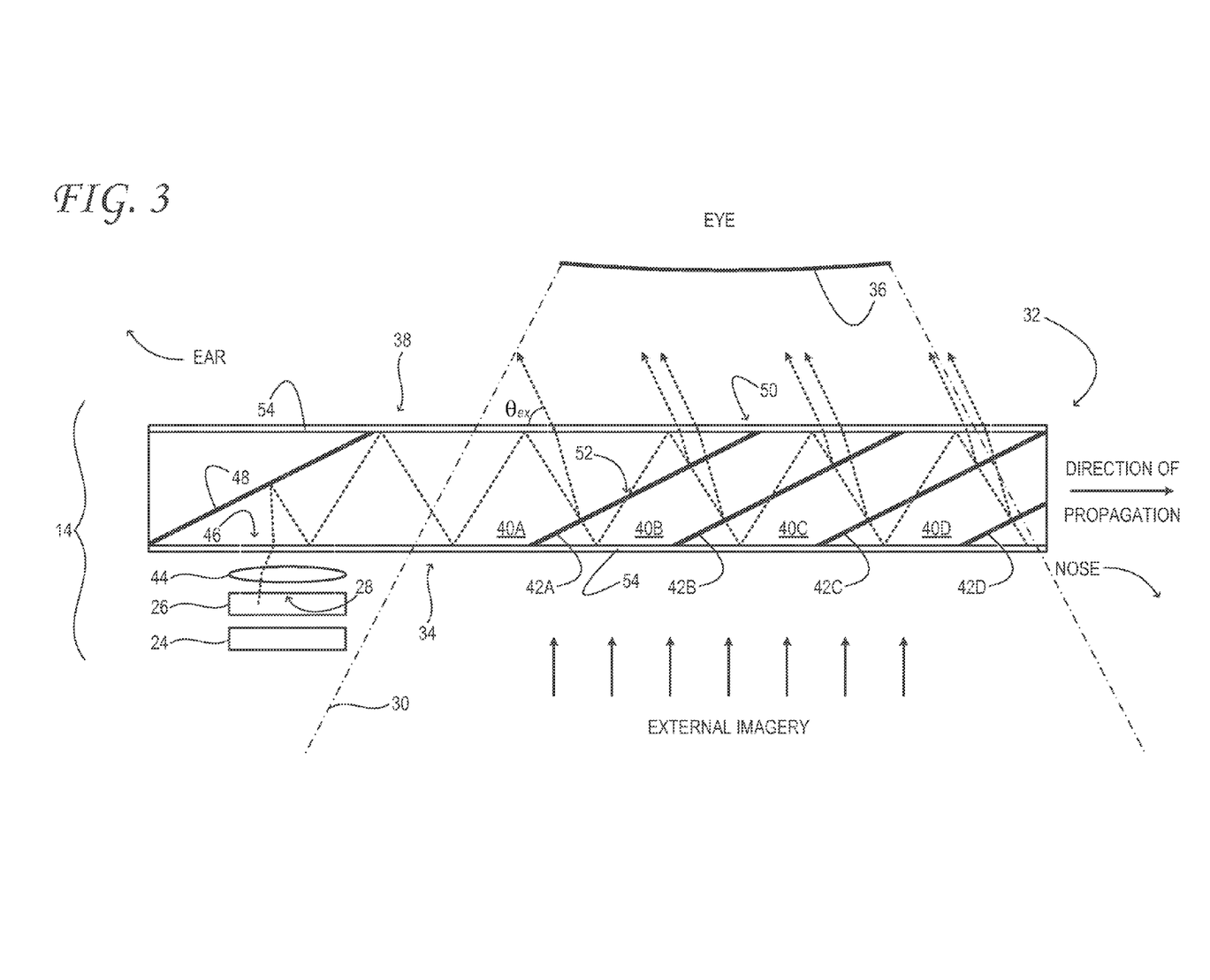
FIG. 3 shows aspects of an example near-eye display system in cross section, in accordance with an embodiment of this disclosure.

FIG. 3 shows selected aspects of near-eye display system 14 in one embodiment. The illustrated near-eye display system includes illuminator 24 and image former 26. The illuminator may comprise a white-light source, such as a white light-emitting diode (LED). The illuminator may further comprise an optic suitable for collimating the emission of the white-light source and directing the emission into the image former. The image former is configured to form a display image and to release the display image through exit pupil 28. The image former may comprise a rectangular array of light valves, such as a liquid-crystal display (LCD) array. The light valves of the array may be arranged to spatially vary and temporally modulate the amount of collimated light transmitted therethrough, so as to form pixels of a display image. Further, the image former may comprise suitable light-filtering elements in registry with the light valves so that the display image formed is a color image.

In other embodiments, the image former may be a reflective liquid-crystal-on-silicon (LCOS) or digital micromirror display (DMD) device. In these embodiments, a transparent illuminator 24 may be arranged on the opposite side of the image former. In another embodiment, illuminator 24 may comprise one or more modulated lasers, and image former 26 may be a rastering optic. The image former may be configured to raster the emission of each laser in synchronicity with its modulation, to form the display image. In yet another embodiment, image former 26 may comprise a rectangular array of color LEDs (e.g., organic LEDs) arranged to form the display image. As each color LED array emits its own light, illuminator 24 may be omitted from this embodiment. The various active components of near-eye display system 14—e.g., image former 26 and illuminator 24, if included—may be operatively coupled to controller 16. The controller may provide suitable control signals that, when received by the image former, cause the desired display image to be formed.

In FIG. 3, image former 26 is shown offset from field of view 30 of the HMD-device wearer. In this configuration, the image former does not obstruct the wearer's view of external imagery transmitted through the HMD device. Accordingly, near-eye display system 14 also includes waveguide 32, an optic configured to receive the display image and to shift the display image into the wearer's field of view.

Waveguide 32 may be substantially transparent to external imagery received normal to its front surface 34. Thus, the waveguide may be positioned in front of the eye of the HMD-device wearer without obstructing the wearer's view of the external imagery. In the embodiment shown in FIG. 3, image former 26 and the anatomical entry pupil 36 of the wearer are located on opposite faces of the waveguide: the image former is adjacent front surface 34, while the wearer's pupil is behind back surface 38. Light from the display image propagates through the waveguide by reflection from the front and back surfaces. In the illustrated embodiment, the direction of propagation is from the temple side—i.e., the end portion of the waveguide closest to the wearer's ear—to the opposite end portion, which is oriented toward the bridge of the wearer's nose.

Continuing in FIG. 3, image former 26 may be a compact component characterized by a small exit pupil 28. The diameter of the exit pupil of the image former may be 5 millimeters (mm), in one example. When two optical components are coupled together, it is desirable for the exit pupil of the upstream component to be about the same size as the entry pupil of the downstream component. If the exit pupil is smaller than the entry pupil, transmission of the image may require very precise alignment of the pupils. Even then, the transmitted image may appear vignetted. If the exit pupil is larger than the entry pupil, a loss of image brightness will occur. In the present case, the downstream component that receives the display image is the wearer's eye, which presents an entry pupil up to 9 mm in diameter under low-light conditions. Accordingly, in the embodiments described herein, waveguide 32 is configured not only to shift the display image into the wearer's field of view, but also to release the display image from an exit pupil larger than that of the image former.

To this end, waveguide 32 includes a series of transparent sections 40 (40A, 40B, etc.) arranged end-to-end, with beamsplitters 42 (42A, 42B, etc.) arranged between adjacent pairs of transparent sections. In some embodiments, each beamsplitter may be formed as a coating supported on its respective transparent section. In the embodiment shown in FIG. 3, the beamsplitters of waveguide 32 are arranged in parallel—i.e., at the same angle $\theta_{bs}$ with respect to the front and back surfaces of the waveguide.

Figure 4:
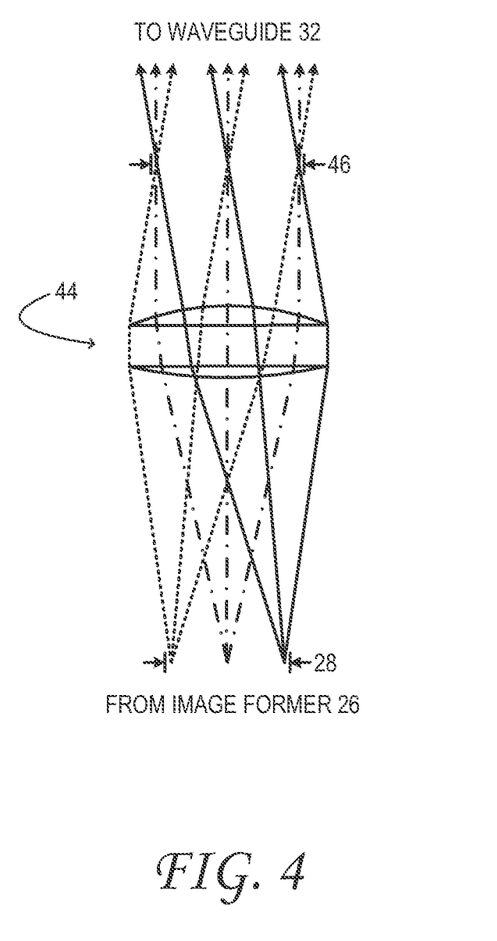
FIG. 4 schematically shows light rays from an image former passing through a collimating lens and into a waveguide, in accordance with an embodiment of this disclosure.

FIG. 3 shows collimating lens 44 arranged to receive divergent light from image former 26, to collimate the light received, and to direct the collimated light into entry pupil 46 of waveguide 32. The entry pupil of the waveguide may be approximately the same size as the exit pupil of the image former-5 mm or less in some embodiments. The image former may be positioned one focal length away from the collimating lens, so that light from each pixel of the display image emerges collimated from the lens, but at an angle that depends on the location of that pixel within the display image. FIG. 4 illustrates this principle schematically. Here, divergent light from exit pupil 28 of the image former is received into entry pupil 46 of the waveguide. It will be understood that waveguide 32 of the present disclosure effects pupil expansion only in the direction of propagation—viz., the horizontal direction in a typical near-eye display configuration. If desired, pupil expansion in the orthogonal—e.g., vertical—direction may be enacted by the collimating lens. Thus, the collimating lens may be a rectangular trimmed lens set, in one embodiment.

Returning now to FIG. 3, light from collimating lens 44 is received into waveguide 32 and reflected from mirror 48. The mirror reflects the light into the first of the series of transparent sections 40 of the waveguide. Ideally, each ray of display light reflected from the mirror will encounter front surface 34 of the waveguide above the Snell's Law critical angle and propagate through the transparent section by total internal reflection (TIR). At the end of each transparent section, the light ray encounters a beamsplitter 42. In one embodiment, the beamsplitter may be an interference structure configured to partially transmit and partially reflect a suitably oriented light ray, as shown in FIG. 3. The reflected ray from the beamsplitter exits the waveguide through back surface 38, while the transmitted ray propagates through to the next transparent section, encounters the next beamsplitter, and is itself split into a transmitted and a reflected ray. In this manner, a single light ray received into waveguide 32 is split into a plurality of parallel light rays distributed along the direction of propagation in the waveguide. This action effectively expands the exit pupil 50 of the waveguide, relative to that of image former 26. As a result of such expansion, the exit pupil of the waveguide may be 9 mm or greater in some embodiments.

Figure 5:
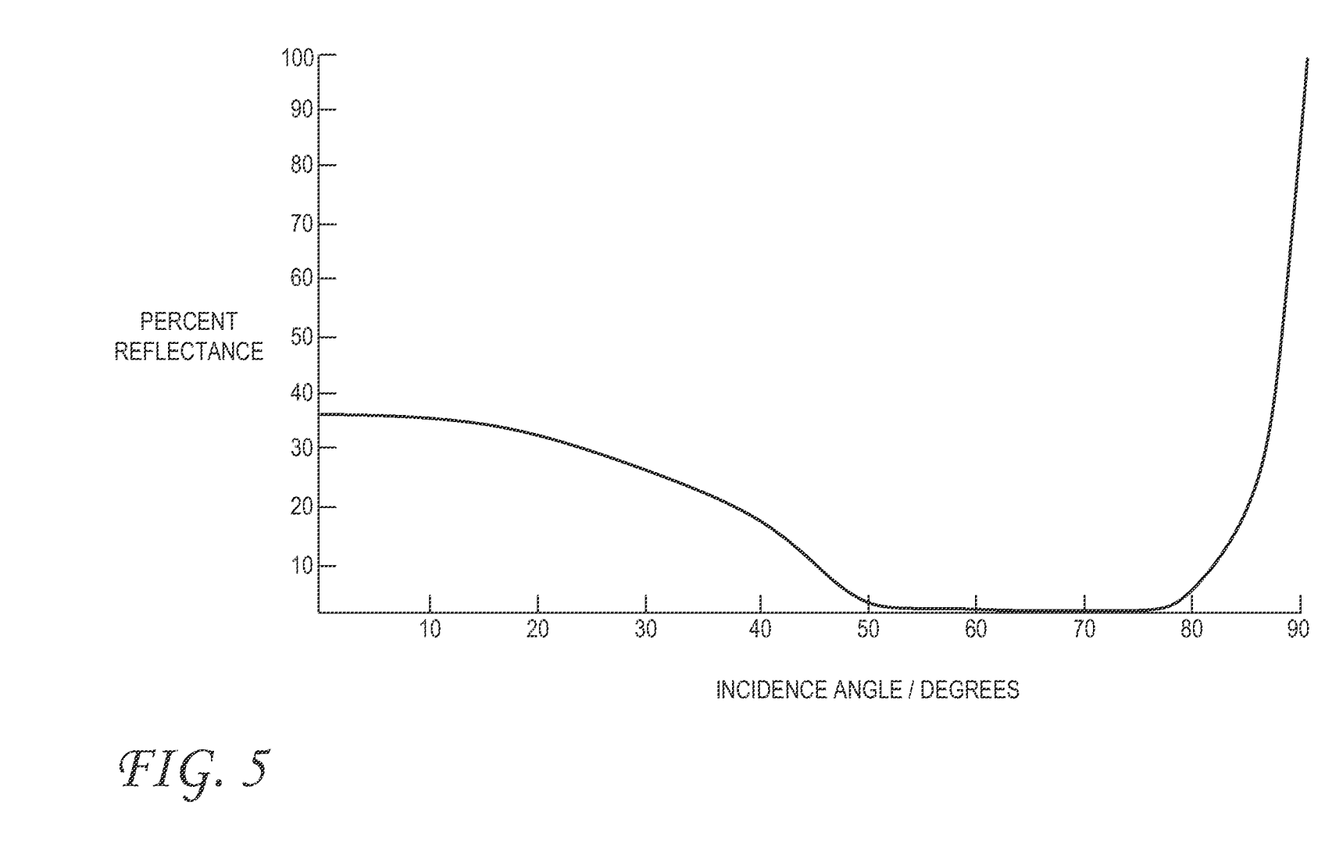
FIG. 5 is a graph illustrating the reflectance of a beamsplitter as a function of incidence angle, in accordance with an embodiment of this disclosure.

Referring again to FIG. 3, the desired beam splitting occurs when a light ray encounters the back side of a beamsplitter, the side opposite back surface 38 of the waveguide. However, a light ray may also encounter the front side of a beamsplitter, the side opposite front surface 34. The desired result of this encounter is for the light ray to pass directly through the beamsplitter, as shown by example at intersection 52. Accordingly, beamsplitters 42 may each comprise a coating with incidence-angle dependent reflectance. The reflectance properties of such a coating are illustrated in the graph of FIG. 5. The example coating represented in the graph is substantially transmissive at incidence angles within a range of 50 to 80 degrees, and partially reflective outside of this range. It will be noted that the incidence angles of light rays upon an interface are referenced herein against a line drawn normal to the interface, unless otherwise indicated.

Near-eye display configurations as described above offer the desirable properties of display-image shifting and exit pupil expansion, but may not provide a display image that fills the wearer's field of view. The field of view of the display image is characterized by the minimum and maximum values of the exit angle $\theta_{ex}$, as identified in FIG. 3.

Figure 6:
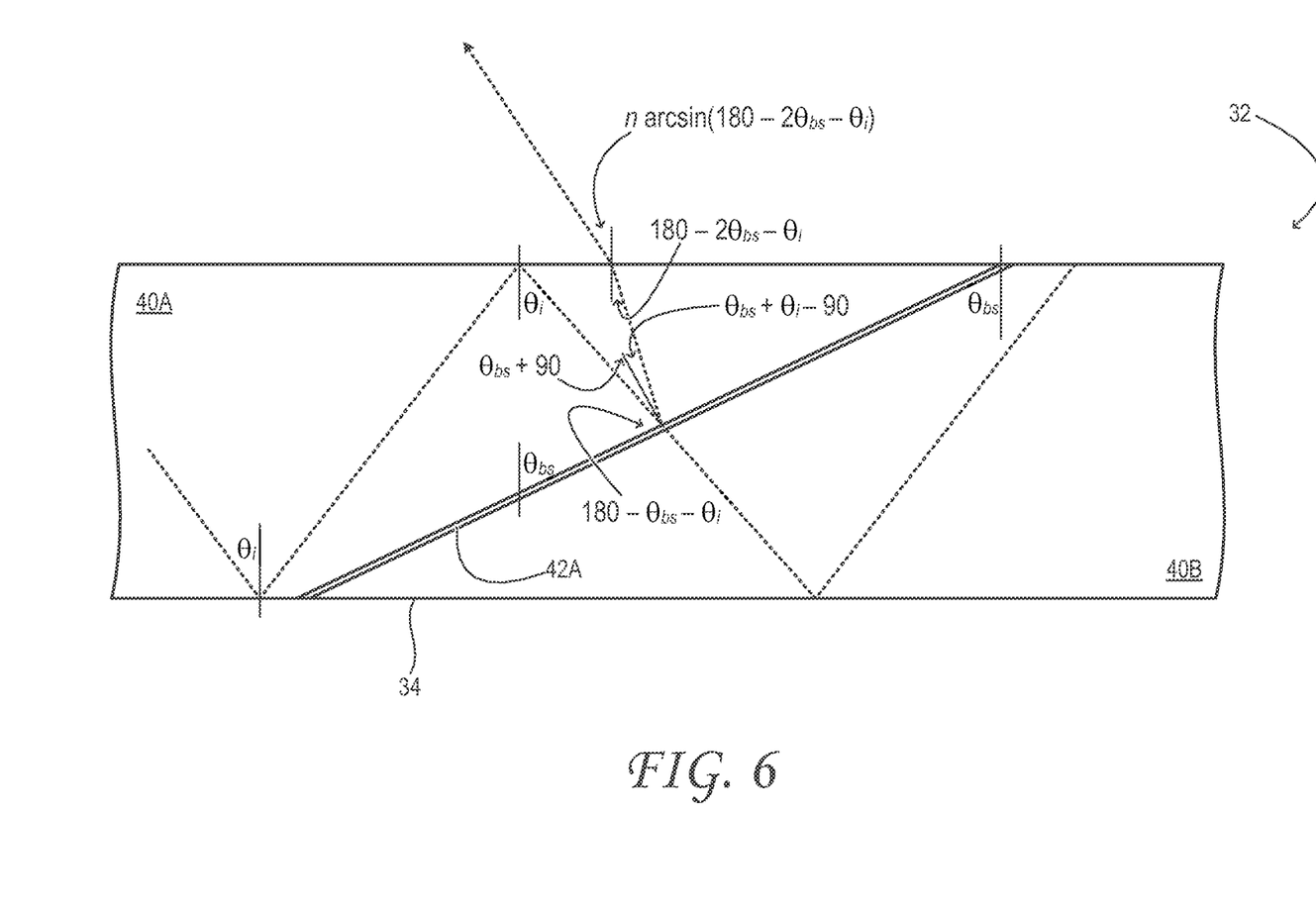
FIGS. 6 and 7 present a geometric-optics analysis of the exit angle of a light ray from a waveguide as a function of initial angle of incidence and beamsplitter angle, in accordance with an embodiment of this disclosure.

FIG. 6 presents a geometric-optics analysis of the exit angle $\theta_{ex}$ of a light ray from waveguide 32 as a function of its initial angle of incidence $\theta_i$ on front surface 34 and of the beamsplitter angle $\theta_{bs}$. This analysis shows that the light ray of maximum $\theta_{ex}$ is one that encounters the front surface at the minimum $\theta_i$ for which the TIR condition is met—viz., at the Snell's Law critical angle. In practice, operating exactly at the critical angle may require undesirably tight manufacturing tolerances, so an adjusted limit may be set a few degrees (e.g., 3°) above the critical angle.

Figure 7:
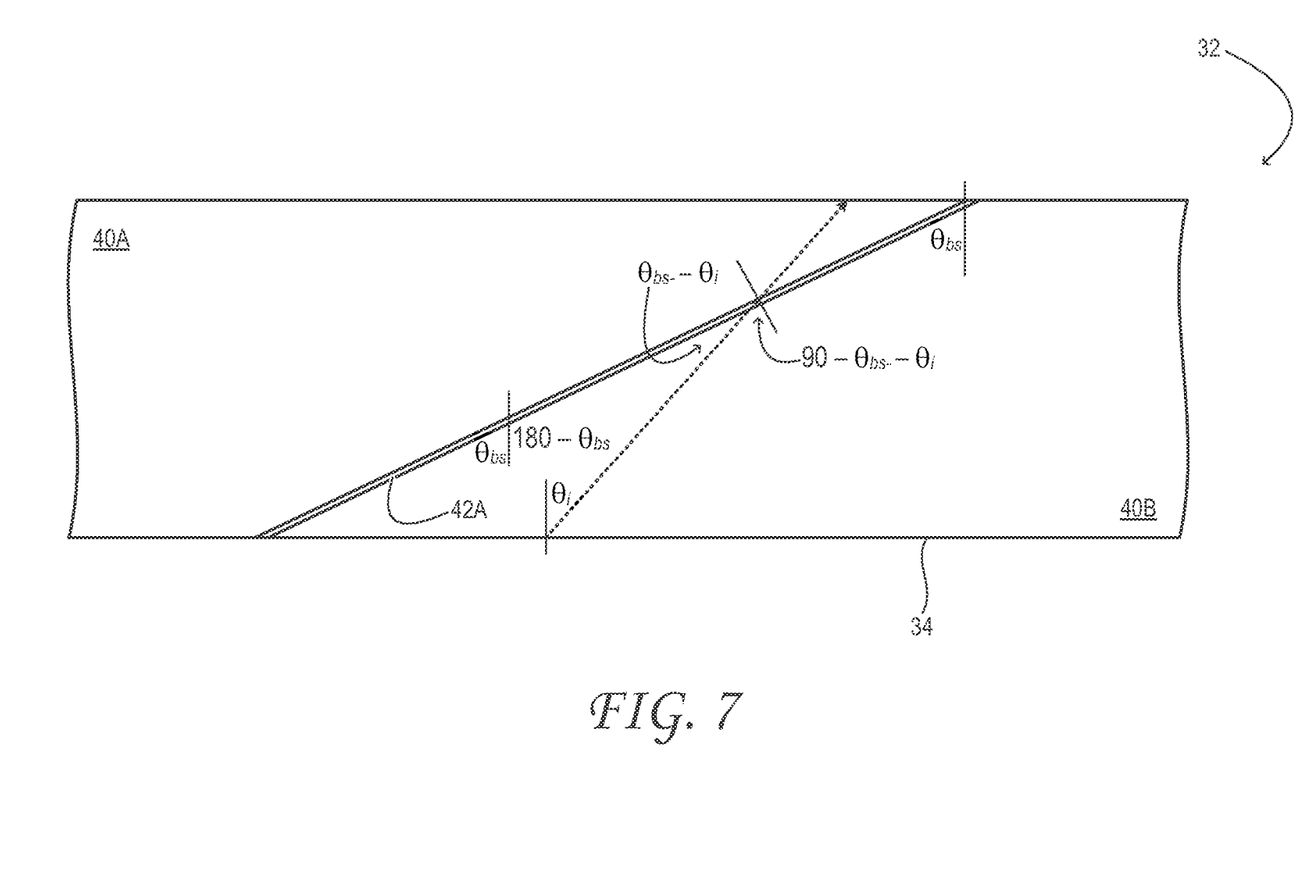

The analysis is continued in FIG. 7, which shows that the minimum value of $\theta_{ex}$ is determined by the maximum glancing angle that can be tolerated for a light ray encountering the front side of a beamsplitter—e.g., intersection 52 in FIG. 3. As shown in FIG. 5, the interface between the transparent section and the beamsplitter becomes highly reflective at angles approaching grazing incidence. Accordingly, a practical upper limit of 85° incidence at the front side of the beamsplitter is used in subsequent calculations.

The TABLE below shows theoretical results of the limiting values of $\theta_{ex}$ based on the analysis in FIGS. 6 and 7. Again, the maximum value of $\theta_{ex}$ is derived from initial incidence at the critical angle plus 3°; the minimum value of $\theta_{ex}$ is derived from glancing incidence at 85° from the beamsplitter normal. Based on the computed minimum and maximum $\theta_{ex}$, an adjusted angular range of the field of view is also computed.

| refractive index n | $\theta_{bs}$/ degrees | transmission coating angle | maximum $\theta_{ex}$/degrees | minimum $\theta_{ex}$/degrees | adjusted field of view range |
|---|---|---|---|---|---|
| 1.70 | 60 | 66.0 | 37.5 | 8.5 | 29.0 |
| 1.70 | 65 | 61.0 | 18.9 | −17.2 | 36.1 |
| 1.70 | 70 | 56.0 | 1.7 | −45.9 | 47.6 |
| 1.70 | 75 | 51.0 | −15.4 | −87.8 | 72.3 |
| 1.75 | 60 | 63.0 | 45.4 | 8.8 | 36.6 |
| 1.75 | 65 | 58.0 | 25.0 | −17.7 | 42.7 |
| 1.75 | 70 | 53.0 | 7.0 | −47.7 | 54.7 |
| 1.75 | 75 | 53.0 | −10.5 | −78.1 | 67.6 |
| 1.75 | 65.75 | 57.25 | 22.26 | −22.26 | 44.5 |
| 1.80 | 60 | 63.0 | 47.1 | 9.0 | 38.0 |
| 1.80 | 65 | 58.0 | 25.8 | −18.2 | 44.0 |
| 1.80 | 70 | 53.0 | 7.2 | −49.5 | 56.7 |
| 1.80 | 75 | 53.0 | −10.8 | −78.6 | 67.8 |
| 1.80 | 65.75 | 57.25 | 22.93 | −22.93 | 45.9 |
| 1.85 | 60 | 63.0 | 48.8 | 9.3 | 39.5 |
| 1.85 | 65 | 58.0 | 26.6 | −18.7 | 45.3 |
| 1.85 | 70 | 53.0 | 7.4 | −51.4 | 58.8 |
| 1.85 | 75 | 53.0 | −11.1 | −78.6 | 67.5 |
| 1.85 | 57.30 | 57.30 | 23.80 | −23.41 | 47.2 |

The first four entries in the table are for a waveguide comprising transparent sections of refractive index n=1.70. The field of view increases with $\theta_{bs}$, however, increasing $\theta_{bs}$ also biases the field of view to one side of the waveguide normal. In the extreme case, the field of view is totally on one side of the normal and extends practically to normal incidence (−87.8° in the TABLE). With $\theta_{bs}$=65°, the field of view is nearly balanced and exhibits a range of 36.1°.

As shown in the subsequent entries of the TABLE, an increase in refractive index increases the field of view range and requires a slightly different $\theta_{bs}$ to balance the field of view about the waveguide normal. Thus, to achieve a broader field of view, waveguide 32 may be configured so that the display light propagates through a material of refractive index greater than 1.7, arranged between the front and back surfaces. In other words, the transparent section material itself may have a refractive index greater than 1.7.

The last five entries of the TABLE correspond to n=1.85, the refractive index of Schott glass SFL-57, which is close to the refractive-index limit for optical glass. These entries show that the practical range of a balanced field of view is about 47°. Thus, in one waveguide embodiment, transparent sections 40 may comprise a high refractive-index optical glass such as Schott glass SFL-57. In this and other embodiments, the transparent sections may be constructed such that $\theta_{bs}$ is chosen to balance the field of view about the waveguide normal.

Figure 8:
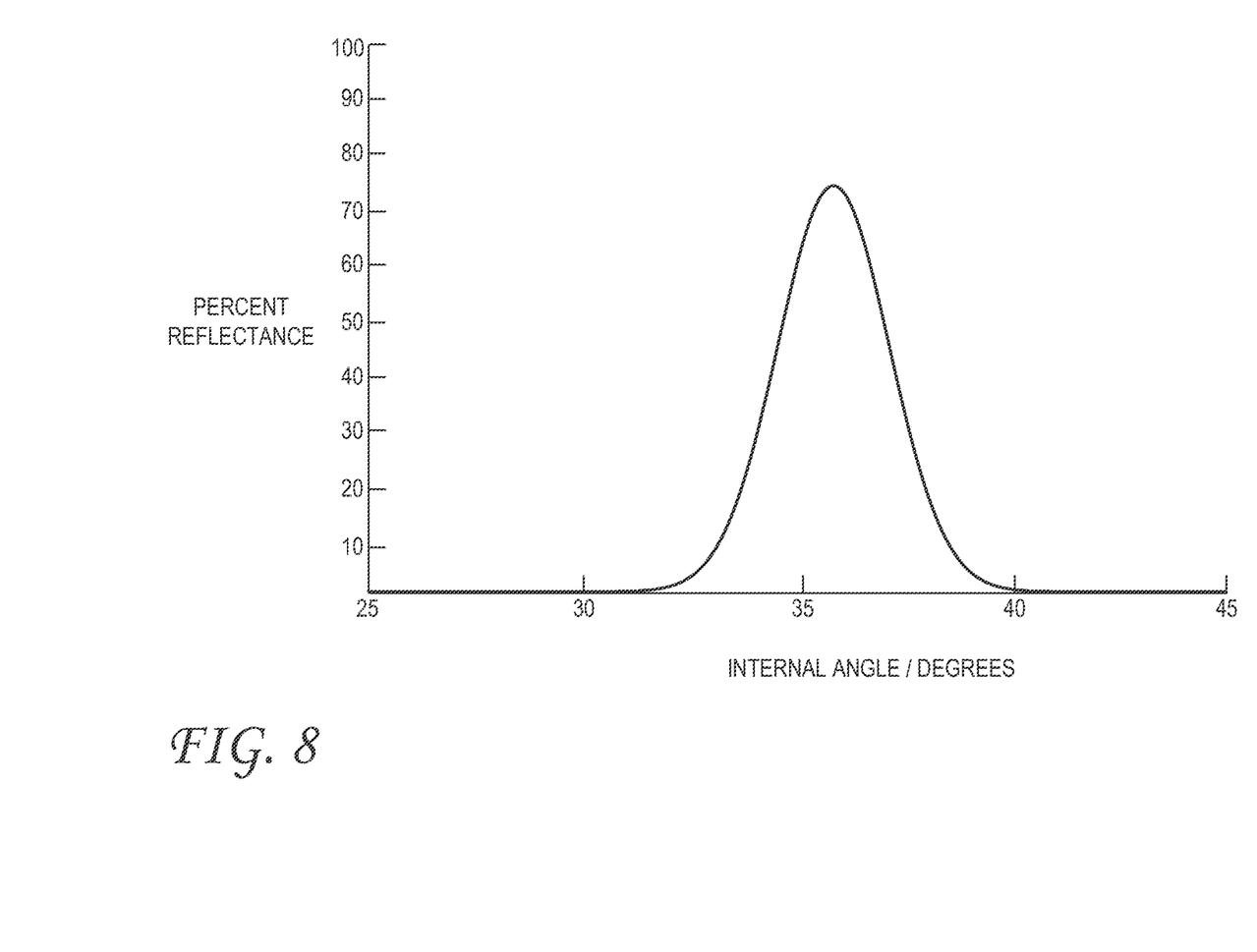
FIGS. 8 and 9 are graphs showing the reflectance of a partially reflective dielectric cladding as a function of incidence angle, in accordance with an embodiment of this disclosure.

Waveguide 32 may include still other features for extending the field of view, in particular, by increasing the maximum $\theta_{ex}$ beyond the TIR limit. In the embodiment of FIG. 3, for instance, partially reflective dielectric cladding 54 is arranged on front surface 34 and on back surface 38 of the waveguide. The dielectric cladding may be a thin-film interference coating, in one embodiment. The optical properties of one example cladding are summarized in FIGS. 8 and 9. FIG. 8 shows the reflectance of the cladding as a function of internal angle. As shown in the graph, the reflectance of the cladding increases with incidence angle over a certain range of incidence angles, such that light rays reaching the front and back surfaces at higher incidence angles within that range are reflected more strongly than light rays reaching the front and back surfaces at lower incidence angles. In another range, the reflectance of the cladding decreases with incidence angle, such that light rays reaching the front and back surfaces at higher incidence angles are reflected less strongly than light rays reaching the front and back surfaces at lower incidence angles. Combined, this behavior is characteristic of a narrow-notch coating.

More particularly, in the graph of FIG. 8, the reflectance of the cladding ascends to a high value at about 36° incidence, and falls off at higher and lower angles of incidence. The fall off at low angles of incidence allows the exit ray to escape the waveguide, and also allows external imagery to be sighted directly through the waveguide, preserving the see-through quality of the display. The fall off at high angles of incidence also improves the efficiency of escaping display light. Further, it reduces stray light, which might otherwise contribute to ghost images, spurious points of light, and veiling glare.

Figure 9:
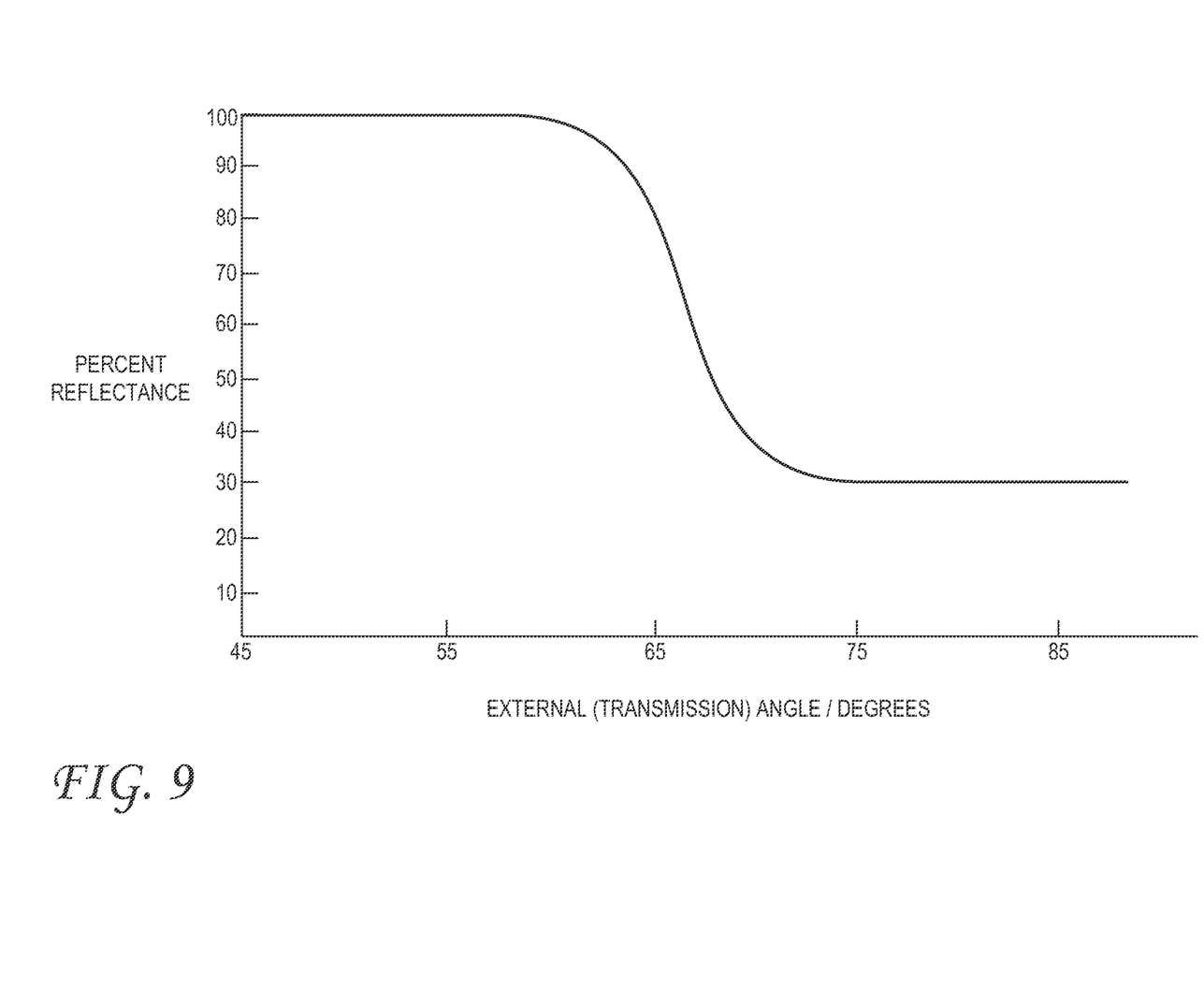

FIG. 9 shows the reflectance of the clad substrate as a function of external (i.e., transmission) angle. Without the cladding, light close to grazing incidence would be transmitted into and out of the substrate. The cladding effectively cuts down this transmission at large angles of incidence.

With respect to the minimum $\theta_{ex}$ limit, it will again be noted that the figures in the TABLE above were obtained from assuming that 85° glancing incidence on the front side of beamsplitters 42 could be tolerated. This is the angle at which the coating itself becomes reflective, as shown in FIG. 5. However, various other factors may impose a lower angular limit for glancing incidence, which, according to the analysis in FIG. 7, results in a higher minimum $\theta_{ex}$ and a correspondingly smaller field of view.

Figure 10:
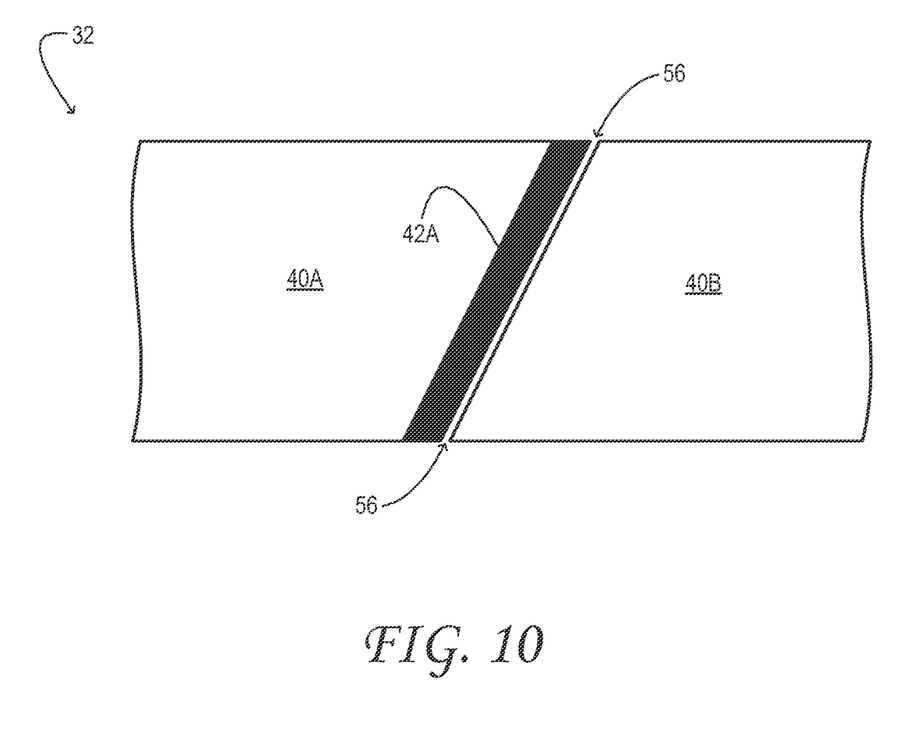
FIG. 10 shows an example interface between adjacent transparent sections of a waveguide in accordance with an embodiment of this disclosure.

FIG. 10 illustrates this point. The drawing shows an example interface between transparent sections 40A and 40B in waveguide 32. Transparent section 40A, as illustrated, is coated on the right side with an interference coating to form beamsplitter 42A. The coated right side of transparent section 40A is then bonded to the left side of adjacent transparent section 40B, which is uncoated. In FIG. 10, bonding region 56 forms the interface between the coated right side of transparent section 40A and the uncoated left side of transparent section 40B.

In one embodiment, bonding region 56 may include an adhesive. The adhesive layer typically used to bond optical components may be greater or comparable in thickness to the wavelengths of light transmitted through the interface. Accordingly, an adhesive, if used in this manner, should be index-matched as closely as possible to the material from which the transparent sections are formed. If the refractive index of an adhesive-based bonding layer is different than the refractive index of the transparent section material, various unwanted optical effects may result. For instance, some of the display light may be reflected out of the waveguide, reducing the image brightness. Angle-dependent Fresnel reflection and TIR within the adhesive layer are also possible.

Index matching is practical for transparent section materials of n≤1.7, because optical adhesives in this range are readily available. However, when the refractive index of the transparent section material is increased to higher values—useful for increasing the maximum $\theta_{ex}$ limit—an appropriate, index-matched adhesive may not be available. It will be noted that using n=1.7 adhesive with n=1.85 glass will lower the glancing limit to 66.8°, far short of the 85° limit assumed in the foregoing calculations.

To avoid such issues, the bonding region can be made much thinner than the shortest wavelength of light traversing the interface. The thickness of the bonding region may, for instance, be less than one-fourth of the shortest wavelength of light from the display image, less than one-tenth, etc. To this end, bonding region 56 may be adhesiveless in some embodiments. One way to create an adhesiveless bonding region is to use so-called activated covalent bonding technology.

The bonding region may comprise a first chemical moiety at a surface of the beamsplitter, which is covalently linked to a second chemical moiety at a surface of the adjacent transparent section. Furthermore, one or both of the first chemical moiety and the second chemical moiety may be thermally or photochemically activatable toward a chemical reaction covalently linking the first and second chemical moieties. In one embodiment, a smooth, exposed surface of the beamsplitter 42A coating may include a first functional group. The smooth surface of transparent section 40B to be joined to the beamsplitter may include a second functional group. The first and second functional groups may be chosen to form a strong, stable covalent bond when two transparent sections are placed in contact and suitable activation conditions are provided. Such activation conditions may include increased temperature and/or visible or ultraviolet irradiation, for example. The bonding region 56 formed in this manner may be extremely thin—i.e., a small fraction of the wavelength of the light rays conducted through the waveguide. Accordingly, the light waves 'see' no mismatch in the refractive index of the medium as they traverse the bonding region.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:
1. A near-eye display system comprising:
an image former configured to form a display image and to release the display image through a first exit pupil; and a waveguide having a back surface facing a wearer's eye, a front surface opposite the back surface, and a partially reflective dielectric cladding arranged on the front and back surfaces, the partially reflective dielectric cladding having a reflectance that decreases with increasing incidence angle over an upper range of incidence angles, so that light rays reaching the front and back surfaces at higher incidence angles within the upper range are reflected less strongly than light rays reaching the front and back surfaces at lower incidence angles, the waveguide being substantially transparent to external imagery received normal to the front surface, and configured to receive the display image from the image former and to release the display image through a second exit pupil larger than the first exit pupil, the waveguide including a plurality of transparent sections arranged end-to-end, each transparent section supporting a beamsplitter with a first chemical moiety, the beamsplitter of one transparent section joined covalently to a second chemical moiety on an adjacent transparent section.

2. The system of claim 1 wherein light from the display image propagates through the waveguide by reflection from the front and back surfaces.

3. The system of claim 2 wherein the reflectance of the partially reflective dielectric cladding increases with incidence angle over a lower range of incidence angles different from the upper range, such that light rays reaching the front and back surfaces at higher incidence angles within the lower range are reflected more strongly than light rays reaching the front and back surfaces at lower incidence angles.

4. The system of claim 2 wherein the light propagates through a material of refractive index greater than 1.7, arranged between the front and back surfaces.

5. The system of claim 1 further comprising a lens arranged to receive divergent light from the image former, to collimate the light received, and to direct the collimated light into the waveguide.

6. The system of claim 1 wherein the image former comprises a liquid-crystal display array.

7. The system of claim 1 wherein the first and second chemical moieties are joined within a bonding region of thickness less than one-fourth of a shortest wavelength of light from the display image.

8. A near-eye display system comprising:
an image former configured to form a display image and to release the display image through a first exit pupil; and
a waveguide having a back surface facing a wearer's eye and a front surface opposite the back surface, the waveguide being substantially transparent to external imagery received normal to the front surface, and configured to receive the display image from the image former and to release the display image through a second exit pupil larger than the first exit pupil, the waveguide including a plurality of transparent sections arranged end-to-end, each transparent section having a refractive index greater than 1.7 and supporting a beamsplitter, the beamsplitter of one transparent section joined to an adjacent transparent section via a bonding region of thickness less than one-tenth of a shortest wavelength of light from the display image.

9. The system of claim 8 wherein each beamsplitter comprises an interference coating with incidence-angle dependent reflectance.

10. The system of claim 8 wherein each beamsplitter is substantially transmissive at incidence angles within a range of 50 to 80 degrees and partially reflective outside of this range.

11. The system of claim 8 wherein the bonding region is an adhesiveless bonding region.

12. The system of claim 8 wherein the bonding region comprises a first chemical moiety at a surface of the beamsplitter, covalently linked to a second chemical moiety at a surface of the adjacent transparent section.

13. The system of claim 12 wherein one or both of the first chemical moiety and the second chemical moiety is thermally or photochemically activatable toward a chemical reaction covalently linking the first and second chemical moieties.

14. The system of claim 8 wherein the waveguide further comprises a dielectric cladding with incidence-angle dependent reflectance.

15. A waveguide comprising:
opposing front and back surfaces, the waveguide being substantially transparent to external imagery received normal to the front surface and configured to receive an image through an entry pupil, and to release the image through an exit pupil on the back surface, the exit pupil being larger than the entry pupil;
a plurality of transparent sections arranged end-to-end, each transparent section supporting a beamsplitter, the beamsplitter of one transparent section joined to an adjacent transparent section via a bonding region of thickness less than one-tenth of a shortest wavelength of light from the image; and
a partially reflective dielectric cladding with incidence-angle dependent reflectance arranged on the front and back surfaces of the waveguide, the partially reflective dielectric cladding having a reflectance that decreases with increasing incidence angle over an upper range of incidence angles, so that light rays reaching the front and back surfaces at higher incidence angles within the upper range are reflected less strongly than light rays reaching the front and back surfaces at lower incidence angles.

16. The waveguide of claim 15 wherein a refractive index of each transparent section is greater than 1.7.

17. The waveguide of claim 15 wherein the entry pupil is five millimeters or less in diameter.

18. The waveguide of claim 15 wherein the exit pupil is nine millimeters or greater in diameter.

* * * * *